United States Patent
Shinano et al.

(10) Patent No.: US 11,223,045 B2
(45) Date of Patent: Jan. 11, 2022

(54) METHOD FOR PRODUCING ORGANO-SULFUR ELECTRODE ACTIVE MATERIAL

(71) Applicant: ADEKA CORPORATION, Tokyo (JP)

(72) Inventors: Hirokatsu Shinano, Tokyo (JP); Kenji Kakiage, Tokyo (JP); Yohei Aoyama, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 139 days.

(21) Appl. No.: 16/756,580

(22) PCT Filed: Oct. 30, 2018

(86) PCT No.: PCT/JP2018/040296
§ 371 (c)(1),
(2) Date: Apr. 16, 2020

(87) PCT Pub. No.: WO2019/088087
PCT Pub. Date: May 9, 2019

(65) Prior Publication Data
US 2020/0243860 A1  Jul. 30, 2020

(30) Foreign Application Priority Data
Oct. 31, 2017  (JP) .............................. JP2017-211290

(51) Int. Cl.
*H01M 4/60* (2006.01)
*H01M 4/70* (2006.01)
*H01M 4/66* (2006.01)

(52) U.S. Cl.
CPC ............. *H01M 4/60* (2013.01); *H01M 4/661* (2013.01); *H01M 4/70* (2013.01)

(58) Field of Classification Search
None
See application file for complete search history.

(56) References Cited

U.S. PATENT DOCUMENTS

| 2011/0200875 A1 | 8/2011 | Miyuki et al. |
| 2014/0134485 A1 | 5/2014 | Miyuki et al. |

FOREIGN PATENT DOCUMENTS

| CN | 106159273 A | * 11/2016 |
| JP | 2003-151550 | 5/2003 |

(Continued)

OTHER PUBLICATIONS

International Search Report, PCT/JP2018/040296, dated Feb. 5, 2019.

(Continued)

Primary Examiner — Tracy M Dove
(74) Attorney, Agent, or Firm — Nixon & Vanderhye

(57) ABSTRACT

Disclosed is a sulfur-based electrode active material with which a nonaqueous electrolyte secondary battery that has a large capacity and exhibits less deterioration of the cycle characteristics can be obtained even when an electrode is employed in which the sulfur-based electrode active material is used as an electrode active material and an aluminum foil is used as a current collector. Also disclosed is a method for producing an organosulfur electrode active material, including a step of obtaining an organosulfur compound by heat-treating an organic compound and sulfur and a step of treating the organosulfur compound with a basic compound. The organosulfur compound is preferably sulfur-modified polyacrylonitrile, and the basic compound is preferably ammonia. The organosulfur compound may be treated with the basic compound after the organosulfur compound is ground, or may be ground in a medium that contains the basic compound.

20 Claims, 2 Drawing Sheets

(56) References Cited

FOREIGN PATENT DOCUMENTS

| | | |
|---|---|---|
| JP | 2003-178750 | 6/2003 |
| JP | 2011-028948 A | 2/2011 |
| JP | 2011170991 | 9/2011 |
| JP | 2012-099342 | 5/2012 |
| JP | 2012-150933 | 8/2012 |
| JP | 2012-150934 | 8/2012 |
| JP | 2013-054957 A | 3/2013 |
| JP | 2017-195174 | 10/2017 |
| WO | WO 2012/114651 | 8/2012 |
| WO | WO 2017/110710 | 6/2017 |

OTHER PUBLICATIONS

Yu et al., "Lithium storage in conductive sulfur-containing polymers," Journal of Electroanalytical Chemistry, vol. 573, 2004, pp. 121-128.

* cited by examiner

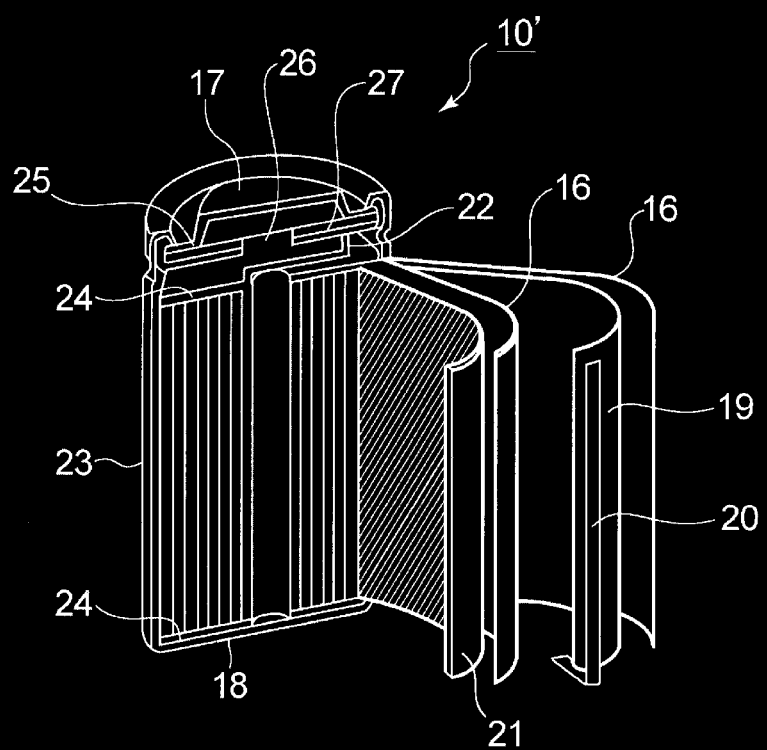

METHOD FOR PRODUCING ORGANO-SULFUR ELECTRODE ACTIVE MATERIAL

TECHNICAL FIELD

The present invention relates to a method for producing an organosulfur electrode active material that can be favorably used in a secondary battery electrode.

BACKGROUND ART

Nonaqueous electrolyte secondary batteries such as lithium ion secondary batteries are compact and lightweight, have a high energy density, are furthermore capable of charging and discharging repeatedly, and are widely used as power sources for portable electronic devices such as portable personal computers, hand-held video cameras, and information terminals. Also, from an environmental point of view, electric automobiles that use nonaqueous electrolyte secondary batteries and hybrid vehicles that use electrical power as part of motive power are put into practical use. Therefore, in recent years, there has been demand for further improvements in performance of secondary batteries.

A lithium ion secondary battery is constituted by an electrode, a separator, an electrolytic solution, and other members. The electrode is constituted by a current collector and an electrode mixture layer that is formed on the current collector and contains an electrode active material and a binding agent. Since the characteristics of electrodes depend on electrode active materials, research and development on electrode active materials have been actively conducted.

Sulfur is a substance that theoretically has a high capacitance, and therefore, research on the use of elemental sulfur as a positive electrode active material has been pursued. A lithium ion secondary battery in which elemental sulfur is used as an active material generates a compound of sulfur and lithium during discharge. This compound dissolves in an organic solvent that is used in a nonaqueous electrolyte. Accordingly, there is the problem in that, during repeated charge and discharge of a nonaqueous electrolyte secondary battery, sulfur, which serves as the active material, gradually dissolves in the organic solvent, causing deterioration of the cycle characteristics of the secondary battery. To address this problem, organosulfur electrode active materials having a sulfur-carbon bond have been developed, and the use of such organosulfur electrode active materials as electrode active materials have been studied (see Patent Literatures 1 to 7, for example).

An aluminum foil is inexpensive and is therefore often used as the current collector of an electrode for a lithium ion secondary battery. However, if an organosulfur electrode active material is used as the electrode active material, problems such as a reduction in the battery capacity and a deterioration of the cycle characteristics arise, and for this reason, a mesh sheet is used (see Patent Literatures 2 to 7, for example).

CITATION LIST

Patent Literatures

Patent Literature 1: JP 2003-151550A
Patent Literature 2: US 2011200875A1
Patent Literature 3: JP 2011-170991A
Patent Literature 4: WO 2012/114651
Patent Literature 5: JP 2012-099342A
Patent Literature 6: JP 2012-150933A
Patent Literature 7: JP 2012-150934A

SUMMARY OF INVENTION

An object of the present invention is to provide a sulfur-based electrode active material with which a nonaqueous electrolyte secondary battery that has a large capacity and exhibits less deterioration of the cycle characteristics can be obtained even when an electrode is employed in which the sulfur-based electrode active material is used as an electrode active material and an aluminum foil is used as a current collector.

The inventors of the present invention have conducted in-depth study regarding the above-described object and found that it is possible to achieve the above-described object by treating an organosulfur compound with a basic compound when producing an organosulfur electrode active material, and thus, the present invention was completed. The present invention provides a method for producing an organosulfur electrode active material, the method including a step of obtaining an organosulfur compound by heat-treating an organic compound and sulfur and a step of treating the organosulfur compound with a basic compound.

BRIEF DESCRIPTION OF DRAWINGS

FIG. 3 is a perspective view showing a cross section of an internal structure of the nonaqueous electrolyte secondary battery (cylindrical type) in which the electrode active material of the present invention is used.

DESCRIPTION OF EMBODIMENTS

Figure 1:
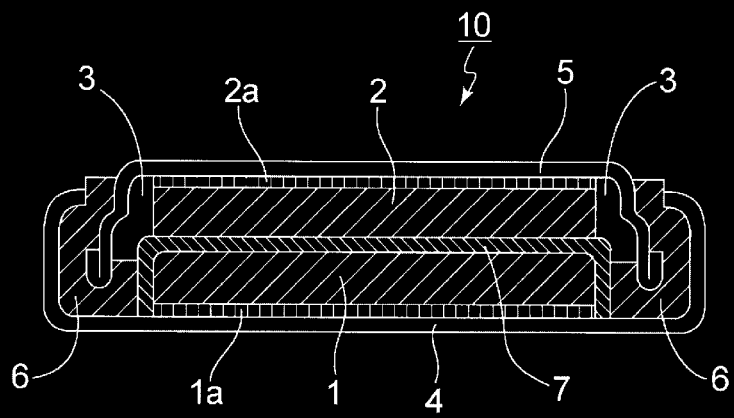
FIG. 1 is a vertical cross-sectional view schematically showing an example of a nonaqueous electrolyte secondary battery (coin type) structure in which an electrode active material of the present invention is used.

Hereinafter, embodiments of the present invention will be described.

Organosulfur Electrode Active Material

In the present invention, an organosulfur electrode active material refers to a sulfur-containing compound that has a sulfur-carbon bond, is capable of occluding and releasing lithium ions, and can be used as an electrode active material of a secondary battery. Note that the sulfur content in the organosulfur electrode active material can be calculated from the results of an analysis that is conducted using a CHN analyzer capable of analyzing sulfur and oxygen.

A method for producing an organosulfur electrode active material of the present invention includes a step of obtaining an organosulfur compound by heat-treating an organic compound and sulfur. Examples of the organosulfur compound include sulfur-modified polyacrylonitrile, a sulfur-modified elastomer compound, a sulfur-modified polynuclear aromatic ring compound, a sulfur-modified pitch compound, a polythienoacene compound, a sulfur-modified polyether compound, a sulfur-modified polyamide compound, a sulfur-modified aliphatic hydrocarbon oxide, a carbon polysulfide compound, and the like. In the present invention, it is preferable to use sulfur-modified polyacrylonitrile as the organosulfur compound because this makes it possible to obtain an electrode active material having excellent cycle characteristics.

Sulfur-modified polyacrylonitrile refers to a compound that is obtained by heat-treating a polyacrylonitrile and elemental sulfur in a non-oxidizing atmosphere. The polyacrylonitrile may be a homopolymer of acrylonitrile or a copolymer of acrylonitrile and another monomer. In the case where the polyacrylonitrile is a copolymer, it is preferable that the acrylonitrile content in the copolymer is at least 90 mass % or more because a low acrylonitrile content results in low battery performance. Examples of the other monomer include acrylic acid, vinyl acetate, N-vinylformamide, and N,N'-methylenebis(acrylamide).

Regarding the ratio between the polyacrylonitrile and elemental sulfur that are used in the heat treatment step, the amount of elemental sulfur is preferably 100 parts by mass to 1,500 parts by mass, and more preferably 150 parts by mass to 1,000 parts by mass, with respect to 100 parts by mass of polyacrylonitrile. The heat treatment temperature is preferably 250° C. to 550° C., and more preferably 350° C. to 450° C., Unreacted elemental sulfur causes a deterioration of the cycle characteristics of a secondary battery, and therefore, it is preferable to remove unreacted elemental sulfur from the sulfur-modified polyacrylonitrile by performing, for example, heating, solvent washing, or the like after the heat treatment. The sulfur content in the sulfur-modified polyacrylonitrile is preferably 25 to 60 mass %, and more preferably 30 to 55 mass %, because a large charge and discharge capacity can be obtained.

A sulfur-modified elastomer compound refers to a compound that is obtained by heat-treating rubber and elemental sulfur in a non-oxidizing atmosphere. Examples of the rubber include natural rubber, isoprene rubber, butadiene rubber, styrene-butadiene rubber, acrylonitrile-butadiene rubber, and the like. These types of rubber can be used alone or in a combination of two or more. The raw material rubber may be vulcanized or unvulcanized.

Regarding the ratio between the rubber and elemental sulfur that are used in the heat treatment step, the amount of elemental sulfur is preferably 100 parts by mass to 1,500 parts by mass, and more preferably 150 parts by mass to 1,000 parts by mass, with respect to 100 parts by mass of rubber. In the heat treatment step, one or more known vulcanization accelerators may be added. The amount of vulcanization accelerator that is added is preferably 1 part by mass to 250 parts by mass, and more preferably 5 parts by mass to 50 parts by mass, with respect to 100 parts by mass of rubber. The heat treatment temperature is preferably 250° C. to 550° C., and more preferably 300° C. to 450° C. Unreacted elemental sulfur causes a deterioration of the cycle characteristics of a secondary battery, and therefore, it is preferable to remove unreacted elemental sulfur from the sulfur-modified elastomer compound by performing, for example, heating, solvent washing, or the like. The sulfur content in the sulfur-modified elastomer compound is preferably 40 to 70 mass %, and more preferably 45 to 60 mass %, because a large charge and discharge capacity can be obtained.

A sulfur-modified polynuclear aromatic ring compound refers to a compound that is obtained by heat-treating a polynuclear aromatic ring compound and elemental sulfur in a non-oxidizing atmosphere. Examples of the polynuclear aromatic ring compound include benzene aromatic ring compounds, such as naphthalene, anthracene, tetracene, pentacene, phenanthrene, chrysene, picene, pyrene, benzopyrene, perylene, and coronene. Other examples include aromatic ring compounds in which part of the rings of benzene aromatic ring compounds are five-membered, or heteroatom-containing heteroaromatic ring compounds in which part of the carbon atoms of these aromatic ring compounds are replaced by sulfur, oxygen, nitrogen, or the like. Furthermore, these polynuclear aromatic ring compounds may have a substituent, such as a chain or branched alkyl group having 1 to 12 carbon atoms, an alkoxyl group, a hydroxyl group, a carboxyl group, an amino group, an aminocarbonyl group, an aminothio group, a mercapto-thiocarbonylamino group, and a carboxyalkylcarbonyl group.

The polynuclear aromatic ring compound may also be a compound that has a structure in which an aromatic moiety and. a chain hydrocarbon moiety are repeated. Examples of the aromatic moiety of the compound that has a structure in which an aromatic moiety and a chain hydrocarbon moiety are repeated include, in addition to the above-described compounds, benzene, pyrrolidine, pyrrole, pyridine, imidazole, pyrrolidone, tetrahydrofuran, triazine, thiophene, oxazole, triazole, thiadiazole, triazole, phosphole, silole, and the like. There are cases where two or more aromatic rings are condensed. These aromatic moieties may be condensed with cyclopentane, cyclohexane, pyrrolidine, tetrahydrofuran, or the like. Moreover, these aromatic moieties may have a substituent, such as a chain or branched alkyl group having 1 to 12 carbon atoms, an alkoxyl group, a hydroxyl group, a carboxyl group, an amino group, an aminocarbonyl group, an aminothio group, a mercapto-thiocarbonylamino group, a carboxyalkylcarbonyl group, or the like.

Examples of the chain hydrocarbon moiety of the compound that has a structure in which an aromatic moiety and a chain hydrocarbon moiety are repeated include linear or branched chain hydrocarbons, such as an alkylene group, an alkenylene group, and an alkynylene group. The chain hydrocarbon moiety has preferably 2 to 20 carbon atoms, more preferably 3 to 10 carbon atoms, and even more preferably 4 to 8 carbon atoms. In terms of the ease of handling and the price, an alkylene group or an alkenylene group is preferable, and a butane-1,4-diyl group, a hexane-1,6-diyl group, an octane-1,8-diyl group, a vinylene group, a 1,3-butadiene-1,4diyl group, and a structural isomer thereof are especially preferable.

Regarding the ratio between the polynuclear aromatic ring compound and elemental sulfur that are used in the heat treatment step, the amount of elemental sulfur is preferably 100 parts by mass to 1,500 parts by mass, and more preferably 150 parts by mass to 1,000 parts by mass, with respect to 100 parts by mass of polynuclear aromatic ring compound. The heat treatment temperature is preferably 250° C. to 550° C., and more preferably 300° C. to 450° C., Unreacted elemental sulfur cases a deterioration of the cycle characteristics of a secondary battery, and therefore, it is preferable to remove unreacted elemental sulfur from the sulfur-modified polynuclear aromatic ring compound by performing, for example, heating, solvent washing, or the like. The sulfur content in the sulfur-modified polynuclear aromatic ring compound is preferably 40 to 70 mass %, and more preferably 45 to 60 mass %, because a large charge and discharge capacity can be obtained.

A sulfur-modified pitch compound refers to a compound that is obtained by heat-treating a pitch and elemental sulfur in a non-oxidizing atmosphere. Examples of the pitch include a petroleum pitch, a coal pitch, a mesophase pitch, asphalt, coal tar, a coal-tar pitch, an organic synthetic pitch that is obtained through polycondensation of a condensed polycyclic aromatic hydrocarbon compound, an organic synthetic pitch that is obtained through polycondensation of a heteroatom-containing condensed polycyclic aromatic hydrocarbon compound, and the like. A pitch is a mixture of various compounds and contains a condensed polycyclic aromatic compound. The condensed polycyclic aromatic compound contained in a pitch may be a single compound or may be a plurality of compounds. The condensed polycyclic aromatic compound may contain, in addition to carbon and hydrogen, nitrogen or sulfur in the ring. For this reason, the main component of a coal pitch is considered to be a mixture of a condensed polycyclic aromatic hydrocarbon composed only of carbon and hydrogen and a heteroaromatic compound containing nitrogen, sulfur, or the like in the condensed ring.

Regarding the ratio between the pitch and elemental sulfur that are used in the heat treatment step, the amount of elemental sulfur is preferably 100 parts by mass to 1,000 parts by mass, and more preferably 150 parts by mass to 500 parts by mass, with respect to 100 parts by mass of pitch. The heat treatment temperature is preferably 300° C. to 500° C., and more preferably 350° C. to 500° C. Unreacted elemental sulfur causes a deterioration of the cycle characteristics of a secondary battery, and therefore, it is preferable to remove unreacted elemental sulfur from the sulfur-modified pitch compound by performing, for example, heating, solvent washing, or the like. The sulfur content in the sulfur-modified pitch compound is preferably 25 to 70 mass %, and more preferably 30 to 60 mass %, because a large charge and discharge capacity can be obtained.

A polythienoacene compound refers to a compound that has a sulfur-containing polythienoacene structure represented by the general formula (1) below.

[Chemical Formula 1]

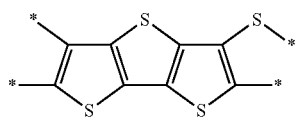

(1)

(In the formula, * represents a bond.)

The polythienoacene compound can be obtained by heat-treating an aliphatic polymer compound that has a straight-chain structure such as polyethylene, or a polymer compound that has a thiophene structure such as polythiophene, and elemental sulfur in a non-oxidizing atmosphere.

In the case where an aliphatic polymer compound that has a straight-chain structure is used as the raw material of the polythienoacene compound, the ratio between the aliphatic polymer compound and elemental sulfur that are used in the heat treatment step is such that the amount of elemental sulfur is preferably 100 parts by mass to 2,000 parts by mass, and more preferably 150 parts by mass to 1,000 parts by mass, with respect to 100 parts by mass of aliphatic polymer compound.

Alternatively, in the case where a polymer compound that has a thiophene structure is used as the raw material, the ratio between the polymer compound that has a thiophene structure and elemental sulfur that are used in the heat treatment step is such that the amount of elemental sulfur is preferably 100 parts by mass to 1,000 parts by mass, and more preferably 150 parts by mass to 800 parts by mass, with respect to 100 parts by mass of polymer compound that has a thiophene structure. The heat treatment temperature is preferably 300° C. to 600° C., and more preferably 350° C. to 500° C. Unreacted elemental sulfur causes a deterioration of the cycle characteristics of a secondary battery, and therefore, it is preferable to remove unreacted elemental sulfur from the polythienoacene compound by performing, for example, heating, solvent washing, or the like. The sulfur content in the polythienoacene compound is preferably 30 to 80 mass %, and more preferably 40 to 70 mass %, because a large charge and discharge capacity can be obtained.

A sulfur-modified polyether compound refers to a compound that is obtained by heat-treating a polyether compound and elemental sulfur in a non-oxidizing atmosphere. Examples of the polyether compound include polyethylene glycol, polypropylene glycol, an ethylene oxide/propylene oxide copolymer, polytetramethylene glycol, and the like. The polyether compound may have an alkyl ether group, an alkyl phenyl ether group, or an acyl group at the terminus or may have an ethylene oxide adduct of a polyol such as glycerin or sorbitol at the terminus.

Regarding the ratio between the polyether compound and elemental sulfur that are used in the heat treatment step, the amount of elemental sulfur is preferably 100 parts by mass to 1,000 parts by mass, and more preferably 200 parts by mass to 500 parts by mass, with respect to 100 parts by mass of polyether compound. The heat treatment temperature is preferably 250° C. to 500° C., and more preferably 300° C. to 450° C. Unreacted elemental sulfur causes a deterioration of the cycle characteristics of a secondary battery, and therefore, it is preferable to remove unreacted elemental sulfur from the sulfur-modified polyether compound by performing, for example, heating, solvent washing, or the like. The sulfur content in the sulfur-modified polyether compound is preferably 30 to 75 mass %, and more preferably 40 to 70 mass %, because a large charge and discharge capacity can be obtained.

A sulfur-modified polyamide compound refers to an organic sulfur compound that has a carbon skeleton derived from a polymer having an amide bond. Specifically, a sulfur-modified polyimide compound is a compound that is obtained by heat-treating an aminocarboxylic acid compound and elemental sulfur, or a polyamine compound, a polycarboxylic acid compound, and elemental sulfur, in a non-oxidizing atmosphere.

In the present invention, an aminocarboxylic acid compound refers to a compound that has one amino group and at least one carboxyl group in the molecule. Examples of the aminocarboxylic acid compound include aminobenzoic acids such as 3,4-diaminobenzoic acid, 3,5-diaminobenzoic acid, p-aminobenzoic acid, and m-aminobenzoic acid, 4-aminophenylacetic acid, 3-aminophenylacetic acid, 3-(4-aminophenyl)propionic acid, 3-aminopropionic acid, 4-aminobutanoic acid, 5-aminopentanoic acid, and 2,5-diaminopentanoic acid, as well as amino acids, such as alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, theanine, tricholomic acid, kainic acid, domoic acid, ibotenic acid, and acromelic acid.

In the present invention, a polyamine compound refers to a compound that has at least two amino groups in the molecule. Examples of the polyamine compound include urea, ethylenediamine, diethylenetriamine, putrescine, cadaverine, hexamethylenediamine, o-phenylenediamine, m-phenylenediamine, p-phenylenediamine, 4-aminobenzene methanamine, 4-aminobenzene ethanamine, melamine, 1,2,4-triaminobenzene, 1,3,5-triaminobenzene, benzoguanamine, and the like.

In the present invention, a polycarboxylic acid compound refers to a compound that has at least two carboxyl groups in the molecule. Examples of the polycarboxylic acid compound include terephthalic acid, fumaric acid, tartaric acid, maleic acid, benzene-1,3-dicarboxylic acid, phthalic acid, oxalic acid, malonic acid, succinic acid, glutaric acid, adipic acid, pimelic acid, suberic acid, azelaic acid, sebacic acid, ethylenediaminetetraacetic acid, and the like. Other examples include phthalic anhydride, maleic anhydride, and the like, and the polycarboxylic acid compound may be an acid anhydride. When producing a sulfur-modified polyamide compound by using a polyamine compound and a polycarboxylic acid compound, it is preferable that the ratio of the polyamine compound and the polycarboxylic acid compound is 0.9 to 1.1 in terms of molar ratio.

Regarding the ratio between the aminocarboxylic acid compound and elemental sulfur that are used in the heat treatment step, the amount of elemental sulfur is preferably 100 parts by mass to 500 parts by mass, and more preferably 150 parts by mass to 400 parts by mass, with respect to 100 parts by mass of aminocarboxylic acid compound. Regarding the ratio between the polyamine compound, the polycarboxylic acid compound, and elemental sulfur, the amount of elemental sulfur is preferably 100 parts by mass to 500 parts by mass, and more preferably 150 parts by mass to 400 parts by mass, with respect to 100 parts by mass of the total mass of the polyamine compound and the polycarboxylic acid compound. The heat treatment temperature is preferably 250° C. to 600° C., and more preferably 350° C. to 500° C. Unreacted elemental sulfur causes a deterioration of the cycle characteristics of a secondary battery, and therefore, it is preferable to remove unreacted elemental sulfur from the sulfur-modified polyamide compound by performing, for example, heating, solvent washing, or the like. The sulfur content in the sulfur-modified polyamide compound is preferably 40 to 70 mass %, and more preferably 45 to 60 mass %, because a large charge and discharge capacity can be obtained.

A sulfur-modified aliphatic hydrocarbon oxide refers to a compound that is obtained by heat-treating an aliphatic hydrocarbon oxide and elemental sulfur in a non-oxidizing atmosphere. In the present invention, an aliphatic hydrocarbon oxide refers to a compound that has an aliphatic hydrocarbon skeleton and at least one group selected from the group consisting of a hydroxyl group, a carbonyl group, a carboxyl group, and an epoxy group, and the hydrocarbon skeleton may have an unsaturated bond. The aliphatic hydrocarbon skeleton of the aliphatic hydrocarbon oxide may be a straight chain or a branched chain, and it is preferable that the aliphatic hydrocarbon skeleton is a straight chain because a large charge and discharge capacity can be obtained. The aliphatic hydrocarbon oxide has preferably 4 to 12 carbon atoms, and more preferably 6 to 10 carbon atoms, because a large charge and discharge capacity can be obtained. Oxygen atoms in the aliphatic hydrocarbon oxide detach therefrom through heat treatment of the aliphatic hydrocarbon oxide together with elemental sulfur, and therefore, the ratio of the number of carbon atoms to the number of oxygen atoms in the aliphatic hydrocarbon oxide is preferably 3 or greater, and more preferably 4 or greater.

Preferred aliphatic hydrocarbon oxides may be alcoholic compounds such as 1-butanol, 2-butanol, 1-pentanol, 3-pentanol, 1-hexanol, 1-heptanol, 1-octanol, 1-nonanal, 1-decanol, 1-butanol, 1-pentanol, 1-hexanol, 1-heptanol, 1-octanol, 2-octanol, 1-nonanol, and 1-decanol; aldehyde compounds such as butanal, pentanal, hexanal, heptanal, octanal, nonanal, and decanal; ketone compounds such as methyl ethyl ketone, diethyl ketone, and methyl hexyl ketone; carboxylic acid compounds such as octanoic acid, nonanoic acid, and decanoic acid; epoxy compounds such as 1,2-butane oxide, 1,2-hexane oxide, 1,2-octane oxide, and 1,2-decane oxide; and the like.

Regarding the ratio between the aliphatic hydrocarbon oxide and elemental sulfur that are used in the heat treatment step, the amount of elemental sulfur is preferably 100 parts by mass to 1,000 parts by mass, and more preferably 200 parts by mass to 500 parts by mass, with respect to 100 parts by mass of aliphatic hydrocarbon oxide. The heat treatment temperature is preferably 300° C. to 500° C., and more preferably 350° C. to 450° C. If the heat treatment temperature is higher than the boiling point of the aliphatic hydrocarbon oxide, it is preferable to perform the production while refluxing the aliphatic hydrocarbon oxide. Unreacted elemental sulfur causes a deterioration of the cycle characteristics of a secondary battery, and therefore, it is preferable to remove unreacted elemental sulfur from the sulfur-modified aliphatic hydrocarbon oxide by performing, for example, heating, solvent washing, or the like. The sulfur content in the sulfur-modified aliphatic hydrocarbon oxide is preferably 45 to 75 mass %, and more preferably 50 to 70 mass %, because a large charge and discharge capacity can be obtained.

A carbon polysulfide compound is a compound represented by the general formula $(CS_x)_n$ (x indicates 0.5 to 2, and n indicates a number of 4 or greater), and, for example, can be obtained by heat-treating a precursor prepared by reacting a complex of an alkali metal sulfide and elemental sulfur with a halogenated unsaturated hydrocarbon such as hexachlorobutadiene. The complex of an alkali metal sulfide and elemental sulfur can be obtained by dissolving an alkali metal sulfide in a solvent such as ethanol and reacting the alkali metal sulfide with sulfur at 10 to 40° C. The ratio between the alkali metal sulfide and sulfur can be set such that the amount of sulfur is 2 to 6 mol with respect to 1 mol of alkali metal sulfide. The reaction of the complex of an alkali metal sulfide and elemental sulfur with the halogenated unsaturated hydrocarbon can be carried out by dissolving the complex in an organic solvent such as N-methyl-2-pyrrolidone and reacting the complex with the halogenated unsaturated hydrocarbon at 10 to 40° C., and it is preferable that the amount of halogenated unsaturated hydrocarbon is 5 to 30 parts by mass with respect to 100 parts by mass of the complex. The precursor prepared by reacting the complex of an alkali metal sulfide and elemental sulfur with the halogenated unsaturated hydrocarbon contains excess alkali metal sulfide and a salt of the alkali metal and the halogen. For this reason, the precursor is washed with water or the like in order to remove these substances, and then heat-treated at 300 to 450° C., or preferably at 320 to 400° C. The carbon polysulfide compound after the heat treatment contains unreacted elemental sulfur, which causes a deterioration of the cycle characteristics of a secondary battery. Therefore, it is preferable to remove unreacted elemental sulfur from the carbon polysulfide compound by performing, for example, heating, solvent washing, or the like. The sulfur content in the carbon polysulfide compound is preferably 65 to 75 mass %, and more preferably 67 to 73 mass %, because a large charge and discharge capacity can be obtained.

Examples of the alkali metal sulfide that is used to produce the carbon polysulfide compound include lithium sulfide, sodium sulfide, and potassium sulfide.

In the case where the heat treatment of an organic compound and sulfur is performed under a non-oxidizing atmosphere, the non-oxidizing atmosphere may be an atmosphere in which the concentration of oxygen in the gas phase is 5 vol % or less, or preferably 2 vol % or less, or more preferably an atmosphere in which substantially no oxygen is contained, such as an inert gas, for example, nitrogen, helium, or argon, atmosphere or a sulfur gas atmosphere.

Basic Compound

The method for producing an organosulfur electrode active material of the present invention includes a step of treating the organosulfur compound with a basic compound.

An organic basic compound and an inorganic basic compound may be used as the basic compound. Examples of the organic basic compound include alkylamine compounds such as methylamine, ethylamine, propylamine, isopropylamine, butylamine, t-butylamine, i-butylamine, dimethylamine, diethylamine, dipropylamine, diisopropylamine, dibutylamine, trimethylamine, triethylamine, tripropylamine, tributylamine, and trioctylamine; cycloalkylamine compounds such as cyclohexylamine; aromatic amine compounds such as aniline, toluidine, and benzylamine; alkanolamine compounds such as monoethanolamine, diethanolamine, triethanolamine, methylethanolamine, and methyldiethanolamine; polyamine compounds such as ethylenediamine, tetramethylethylenediamine, and diethylenetriamine; and pyridine, piperidine, piperazine, morpholine, and the like. Examples of the inorganic basic compound include alkali metal hydroxides such as lithium hydroxide, sodium hydroxide, and potassium hydroxide; alkaline-earth metal hydroxides such as calcium hydroxide, magnesium hydroxide, and barium hydroxide; alkali metal carbonates such as lithium carbonate, sodium carbonate, potassium carbonate, sodium hydrogencarbonate, and potassium hydrogencarbonate; lithium salt compounds and sodium salt compounds of acetic acid, propionic acid, fumaric acid, benzoic acid, terephthalic acid, acrylic acid, malonic acid, thiophene carboxylic acid, and the like; metallic alkoxide compounds such as sodium methoxide, sodium ethoxide, sodium-n-propoxide, sodium-i-propoxide, sodium-n-butoxide, sodium-i-butoxide, sodium-t-butoxide, potassium methoxide, potassium ethoxide, potassium-n-propoxide, potassium-i-propoxide, potassium-n-butoxide, potassium-i-butoxide, and potassium-t-butoxide; and ammonia, basic phosphate compounds, and the like.

Alkylamine compounds and ammonia, which are highly volatile and easy to remove even when used in an excessive amount, are preferably used as the basic compound. Methylamine, ethylamine, propylamine, isopropylamine, dimethylamine, diethylamine, dipropylamine, diisopropylamine, trimethylamine, and ammonia are more preferably used, and ammonia is most preferably used.

Grinding of Organosulfur Compound

In the above-described step of treating the organosulfur compound with the basic compound, the organosulfur compound and the basic compound are brought into contact with each other. Specifically, it is preferable to perform the following procedure.

The organosulfur compound is ground to a desired particle diameter suitable for the intended use. For example, in the case where an organosulfur compound is to be used as an electrode active material of a secondary battery, it is preferable to grind the organosulfur compound to an average particle diameter of about 0.5 μm to 100 μm. In the present invention, the "average particle diameter" refers to a 50% particle diameter as measured using a laser diffraction light scattering method. The particle diameter is a volume-based diameter, and the diameter of secondary particles is measured in the laser scattering light diffraction method.

Although a great deal of labor is required in order to grind the organosulfur compound to an average particle diameter of less than 0.5 μm, further improvement in the battery performance cannot be expected. On the other hand, if the average particle diameter is larger than 100 μm, a smooth electrode mixture layer may not be obtained. The average particle diameter of the organosulfur compound is preferably 0.5 μm to 100 μm, more preferably 1 μm to 50 μm, and even more preferably 1 μm to 30 μm. Grinding can be performed through dry grinding, which is performed in a gas, or wet drying, which is performed in a liquid such as water. Industrial grinding methods include, for example, ball milling, roller milling, turbo milling, jet milling, cyclone milling, hammer milling, pin milling, rotation milling, vibration milling, planetary milling, an attritor, and bead milling. Cyclone milling is a method that is used in dry grinding, an attritor and bead milling are methods that are used in wet grinding, and the other methods are used in both wet grinding and dry grinding.

Treatment With Basic Compound

A feature of the production method of the present invention is the treatment of the organosulfur compound with the basic compound. The treatment with the basic compound may be performed before, simultaneously with, or after grinding, in the present invention, it is preferable to perform the treatment simultaneously with or after grinding because the pulverized organosulfur compound can be efficiently treated with the basic compound.

In the case where the organosulfur compound is ground and treated with the basic compound simultaneously, it is preferable to add the organosulfur compound into a medium containing the basic compound and perform wet grinding. The medium that is used for grinding is not particularly limited. Water or an aqueous solution of a lower alcohol, which are inexpensive and free of the risk of catching fire and allow the ground product to dry quickly, is preferable. The amount of the organosulfur compound contained in the medium varies depending on the grinding method. The estimated amount in the case of ball milling or roller milling is 5 to 50 mass %. The concentration of the basic compound in the medium is preferably 0.01 to 5 mass %. After grinding, the ground product is washed with a solvent as necessary, and dried, and thus, an organosulfur electrode active material is obtained according to the method for producing an organosulfur electrode active material of the present invention. In the present invention, the lower alcohol means alcohols having 1 to 3 carbon atoms, such as methanol, ethanol, and propanol.

In the case where the organosulfur compound is treated with the basic compound after grinding, the basic compound can be used as it is or can be used dissolved in a solvent. If the basic compound is used as it is, the basic compound can be used in liquid form or can be used in a vaporized state, and it is preferable to use the basic compound in a vaporized state because uniform and efficient treatment can be performed with a small amount of basic compound. If the basic compound is used dissolved in a solvent, water or an aqueous solution of a lower alcohol, which are inexpensive and free of the risk of catching fire and dry quickly, is preferable as the solvent. The concentration of the basic compound is preferably 0.01 to 5 mass %. After grinding, the ground product is washed with a solvent as necessary, and dried, and thus, an organosulfur electrode active material is obtained according to the method for producing an organosulfur electrode active material of the present invention.

Next, a method for producing a secondary battery electrode of the present invention will be described.

The method for producing a secondary battery electrode of the present invention includes the method for producing an organosulfur electrode active material of the present invention. Specifically, an organosulfur electrode active material that is produced using the method for producing an organosulfur electrode active material of the present invention is applied to a current collector to form an electrode mixture layer containing the organosulfur electrode active material. The electrode mixture layer is formed by applying a slurry prepared by adding the organosulfur electrode active material, a binder, and a conductive assistant to a solvent to the current collector, and drying the applied slurry.

A known binder for an electrode can be used as the binder, and examples thereof include styrene-butadiene rubber, butadiene rubber, polyethylene, polypropylene, polyamide, polyamide-imide, polyimide, polyacrylonitrile, polyurethane, polyvinylidene fluoride, polytetrafluoroethylene, ethylene-propylene-diene rubber, fluororubber, styrene-acrylic ester copolymers, ethylene-vinyl alcohol copolymers, acrylonitrile-butadiene rubber, styrene-isoprene rubber, polymethyl methacrylate, polyacrylate, polyvinyl alcohol, polyvinyl ether, carboxymethyl cellulose, sodium carboxymethyl cellulose, methylcellulose, cellulose nanofibers, polyethylene oxide, starch, polyvinylpyrrolidone, polyvinyl chloride, polyacrylic acid, and the like.

Water-based binders, which have low environmental impact and are unlikely to cause sulfur to dissolve, are preferable as the binder, and styrene-butadiene rubber, sodium carboxymethyl cellulose, and polyacrylic acid are more preferable. A single binder may be used alone as the binder, or two or more binders may be used in combination. The amount of binder contained in the slurry is preferably 1 part by mass to 30 parts by mass, and more preferably 1.5 parts by mass to 20 parts by mass, with respect to 100 parts by mass of organosulfur electrode active material.

Known conductive assistants for electrodes can be used as the conductive assistant, and specific examples thereof include carbon materials, such as natural graphite, artificial graphite, carbon black, Ketjen black, acetylene black, channel black, furnace black, lampblack, thermal black, carbon nanotubes, vapor grown carbon fibers (VGCFs), graphene, fullerene, and needle coke; metal powders, such as aluminum powder, nickel powder, and titanium powder; conductive metal oxides, such as zinc oxide and titanium oxide; and sulfides such as $La_2S_3$, $Sm_2S_3$, $Ce_2S_3$, and $TiS_2$. Regarding the particle diameter of the conductive assistant, the average particle diameter is preferably 0.0001 μm to 100 μm, and more preferably 0.01 μm to 50 μm. The amount of conductive assistant contained in the slurry is usually 0.1 to 50 parts by mass, preferably 1 to 30 parts by mass, and more preferably 2 to 20 parts by mass, with respect to 100 parts by mass of organosulfur electrode active material.

Examples of the solvent that is used to prepare the slurry for use in the present invention include propylene carbonate, ethylene carbonate, diethyl carbonate, dimethyl carbonate, ethyl methyl carbonate, 1,2-dimethoxyethane, 1,2-diethoxyethane, acetonitrile, propionitrile, tetrahydrofuran, 2-methyltetrahydrofuran, dioxane, 1,3-dioxolane, nitromethane, N-methylpyrrolidone, N,N-dimethylformamide, dimethylacetamide, methyl ethyl ketone, cyclohexanone, methyl acetate, methyl acrylate, diethyltriamine, N,N-dimethylaminopropylamine, polyethylene oxide, tetrahydrothran, dimethyl sulfoxide, sulfolane, γ-butyrolactone, water, alcohol, and the like. The amount of solvent that is used can be adjusted depending on the method for applying the slurry. For example, in the case of a doctor blade method, the amount of solvent that is used is preferably 20 to 300 parts by mass, and more preferably 30 to 200 parts by mass, with respect to 100 parts by mass of the total amount of the sulfur-containing active material, the binder, and the conductive assistant.

In addition to the above-described components, the slurry may also contain another component. Examples of the other component include a viscosity modifier, a reinforcement, an antioxidant, and the like.

The method for preparing the slurry is not particularly limited. For example, an ordinary ball mill, a sand mill, a bead mill, a pigment dispersing machine, a mortar machine, an ultrasonic dispersing machine, a homogenizer, a rotation-revolution mixer, a planetary mixer, a FILMIX, a JET PASTER, and the like can be used.

A conductive material, such as titanium, a titanium alloy, aluminum, an aluminum alloy, copper, nickel, stainless steel, or nickel-plated steel, is used as the current collector. The surface of these conductive materials may be coated with carbon. The current collector may have a foil shape, a plate shape, a mesh shape, or the like. Among these options, aluminum is preferable in view of the conductivity and the price, and a foil shape is preferable. In the case of a foil shape, the foil thickness is usually 1 to 100 μm.

If a conventionally used organosulfur electrode active material is used as the electrode active material, an aluminum foil cannot be used as the current collector because this combination causes deterioration of the cycle characteristics of the battery, and therefore, a mesh sheet has been used. However, if an organosulfur electrode active material that is produced using the method for producing an organosulfur electrode active material of the present invention is used as the electrode active material, a favorable capacity and favorable cycle characteristics can be obtained even when an aluminum foil is used. It is supposed that this is because the adhesion between the electrode mixture layer and the current collector is improved by producing the organosulfur electrode active material using the method for producing an organosulfur electrode active material of the present invention.

The method for applying the slurry to the current collector is not particularly limited, and various methods such as a die coater method, a comma coater method, a curtain coater method, a spray coater method, a gravure coater method, a flexo coater method, a knife coater method, a doctor blade method, a reverse roll method, a brush painting method, and a dipping method can be used. A die coater method, a doctor blade method, and a knife coater method are preferable because these methods can be adjusted to the properties, such as the viscosity, and the drying characteristics of the slurry and make it possible to obtain a coating layer with a good surface state. The slurry may be applied to one face or both faces of the current collector. When applying the slurry to both faces of the current collector, the slurry may be applied sequentially, to one face at a time, or simultaneously, to both faces at a time. The slurry may be applied to the surface of the current collector continuously or intermittently, and can be applied in a stripe pattern. The thickness, length, and width of the coating layer can be determined as appropriate depending on the battery size.

The method for drying the slurry that has been applied to the current collector is not particularly limited, and various methods such as drying with warm air, hot air, or low-humidity air; vacuum drying; allowing to stand in a furnace or the like; irradiation with far-infrared rays, infrared rays, electron beams, or the like; and the like can be used. As a result of drying, volatile components such as the solvent are volatilized from the coating of the slurry, and thus, an electrode mixture layer is formed on the current collector. After that, the electrode may be pressed, if necessary. Examples of the pressing method include die pressing and roll pressing. The press pressure is not particularly limited, and is preferably within a range of 0.1 t/cm$^2$ to 3 t/cm$^2$.

Next, an electrode of the present invention will be described. The electrode of the present invention contains an organosulfur electrode active material that is produced using the method for producing an organosulfur electrode active material of the present invention.

The electrode of the present invention has the same configuration as that of a known electrode. Specifically, the electrode of the present invention includes a current collector and an electrode mixture layer formed on the current collector. Moreover, the electrode mixture layer contains an organosulfur electrode active material that is produced using the method for producing an organosulfur electrode active material of the present invention. In the electrode of the present invention, a known current collector can be used as the current collector without limitation, and, preferably, such a current collector includes an aluminum foil.

The electrode of the present invention can be used for, without limitation, a nonaqueous electricity storage device that includes a nonaqueous electrolyte. Examples of the electricity storage device include a primary battery, a secondary battery, an electric double-layer capacitor, a lithium ion capacitor, and the like. The nonaqueous electrolyte may be any of a liquid electrolyte, a gel electrolyte, a solid electrolyte, and the like. The electrode of the present invention can be favorably used in a nonaqueous electrolyte secondary battery, and can be more favorably used in a lithium ion secondary battery. The electrode of the present invention can be used as a positive electrode or a negative electrode of the electricity storage device.

In general, a nonaqueous electrolyte secondary battery is constituted by a positive electrode, a negative electrode, a nonaqueous electrolyte, and a separator. In the case where the electrode of the present invention is used as the positive electrode, an electrode having a known negative electrode active material can be used as the negative electrode, and in the case where the electrode of the present invention is used as the negative electrode, an electrode having a known positive electrode active material can be used as the positive electrode. Note that the negative electrode in the case where the electrode of the present invention is used as the positive electrode, or the positive electrode in the case where the electrode of the present invention is used as the negative electrode, is referred to as the counter electrode.

Examples of the known negative electrode active material include natural graphite, artificial graphite, non-graphitizable carbon, graphitizable carbon, lithium, a lithium alloy, silicon, a silicon alloy, silicon oxide, tin, a tin alloy, tin oxide, phosphorus, germanium, indium, copper oxide, antimony sulfide, titanium oxide, iron oxide, manganese oxide, cobalt oxide, nickel oxide, lead oxide, ruthenium oxide, tungsten oxide, and zinc oxide, as well as composite oxides such as $LiVO_2$, $Li_2VO_4$, and $Li_4Ti_5O_{12}$. These negative electrode active materials may be used alone or in a combination of two or more.

Examples of the known positive electrode active material include a lithium-transition metal composite oxide, a lithium-containing transition metal phosphate compound, a lithium-containing silicate compound, and the like. Vanadium, titanium, chromium, manganese, iron, nickel, copper, and the like are preferable as the transition metal of the lithium-transition metal composite oxide. Specific examples of the lithium-transition metal composite oxide include lithium-cobalt composite oxides such as $LiCoO_2$; lithium-nickel composite oxides such as $LiNiO_2$; lithium-manganese composite oxides such as $LiMnO_2$, $LiMn_2O_4$, and $Li_2MnO_3$; compounds obtained by replacing part of the transition metal atoms serving as the main constituents of these lithium-transition metal composite oxides with other metals such as aluminum, titanium, vanadium, chromium, manganese, iron, cobalt, lithium, nickel, copper, zinc, magnesium, gallium, and zirconium; and the like. Specific examples of the substituted compounds include $Li_{1.1}Mn_{1.8}Mg_{0.1}O_4$, $Li_{1.1}Mn_{1.85}Al_{0.05}O_4$, $LiNi_{0.5}Co_{0.2}Mn_{0.3}O_2$, $LiNi_{0.8}Co_{0.1}Mn_{0.1}O_2$, $LiNi_{0.5}Mn_{0.5}O_2$, $LiNi_{0.80}Co_{0.17}Al_{0.03}O_2$, $LiNi_{0.80}Co_{0.15}Al_{0.05}O_2$, $LiNi_{1/3}Co_{1/3}Mn_{1/3}O_2$, $LiNi_{0.6}Co_{0.2}Mn_{0.2}O_2$, $LiMn_{1.8}Al_{0.2}O_4$, $LiMn_{1.5}Ni_{0.5}O_4$, $Li_2MnO_3$—$LiMO_2$ (M=Co, Ni, or Mn), and the like. Vanadium, titanium, manganese, iron, cobalt, nickel, and the like are preferable as the transition metal of the lithium-containing transition metal phosphate compound, and specific examples of the lithium-containing transition metal phosphate compound include iron phosphate compounds such as $LiFePO_4$ and $LiMn_xFe_{1-x}PO_4$; cobalt phosphate compounds such as $LiCoPO_4$; compounds obtained by replacing part of the transition metal atoms serving as the main constituents of these lithium transition metal phosphate compounds with other metals such as aluminum, titanium, vanadium, chromium, manganese, iron, cobalt, lithium, nickel, copper, zinc, magnesium, gallium, zirconium, and niobium; vanadium phosphate compounds such as $Li_3V_2(PO_4)_3$; and the like. Examples of the lithium-containing silicate compound include $Li_2FeSiO_4$ and the like. These compounds may be used alone or in a combination of two or more.

The counter electrode can be produced by performing the above-described method for producing an electrode of the present invention while replacing the organosulfur electrode active material that is obtained using the method for producing an organosulfur electrode active material of the present invention with the above-described. known negative electrode active material or known positive electrode active material.

Examples of the nonaqueous electrolyte include a liquid electrolyte obtained by dissolving an electrolyte in an organic solvent, a polymer gel electrolyte obtained by dissolving an electrolyte in an organic solvent and gelling the solution with a polymer, a pure polymer electrolyte that contains no organic solvent and in which an electrolyte is dispersed in a polymer, an inorganic solid electrolyte, and the like.

For example, a conventionally known lithium salt is used as the electrolyte for use in the liquid electrolyte and the polymer gel electrolyte, and examples thereof include $LiPF_6$, $LiBF_4$, $LiAsF_6$, $LiCF_3SO_3$, $LiCF_3CO_2$, $LiN(CF_3SO_2)_2$, $LiN(C_2F_5SO_2)_2$, $LiN(SO_2F)_2$, $LiC(CF_3SO_2)_3$, $LiB(CF_3SO_3)_4$, $LiB(C_2O_4)_2$, $LiBF_2(C_2O_4)$, $LiSbF_6$, $LiSiF_5$, $LiSCN$, $LiClO_4$, $LiCl$, $LiF$, $LiBr$, $LiI$, $LiAlF_4$, $LiAlCl_4$, and $LiPO_2F_2$, as well as their derivatives and the like. Among these, at least one selected from the group consisting of $LiPF_6$, $LiBF_4$, $LiClO_4$, $LiAsF_6$, $LiCF_3SO_3$, $LiN(CF_3SO_2)_2$, $LiN(C_2F_5SO_2)_2$, $LiN(SO_2F)_2$, and $LiC(CF_3SO_2)_3$ as well as derivatives of $LiCF_3SO_3$ and derivatives of $LiC(CF_3SO_2)_3$ is preferably used. The electrolyte content in the liquid electrolyte and the polymer gel electrolyte is preferably 0.5 to 7 mol/L, and more preferably 0.8 to 1.8 mol/L.

Examples of the electrolyte for use in the pure polymer electrolyte include $LiN(CF_3SO_2)_2$, $LiN(C_2F_5SO_2)_2$, $LiN(SO_2F)_2$, $LiC(CF_3SO_2)_3$, $LiB(CF_3SO_3)_4$, and $LiB(C_2O_4)_2$.

Examples of the inorganic solid electrolyte include phosphate materials, such as $Li_{1+x}A_xB_{2-y}(PO_4)_3$ (x=Al, Ge, Sn, Hf, Zr, Sc, or Y, B=Ti, Ge, or Zn, and 0<x<0.5), $LiMPO_4$ (M=Mn, Fe, Co, or Ni), and $Li_3PO_4$; lithium composite oxides, such as $Li_3XO_4$ (X=As or V), $Li_{3+x}A_xB_{1-x}O_4$ (A=Si, Ge, or Ti, B=P, As, or V, and 0<x<0.6), $Li_{4+x}A_xSi_{1-x}O_4$ (A=B, Al, Ga, Cr, or Fe and 0<x<0.4) (A=Ni, or Co and 0<x<0.1) $Li_{4+3y}Al_ySiO_4$ (0<y<0.06), $Li_{4-2y}Zn_yGeO_4$ (0<y<0.25), $LiAlO_2$, $Li_2BO_4$, $Li_4XO_4$ (X=Si, Ge, or Ti), and lithium titanates ($LiTiO_2$, $LiTi_2O_4$, $Li_4TiO_4$, $Li_2TiO_3$, $Li_2Ti_3O_7$, and $Li_4Ti_5O_{12}$); compounds that contain lithium and a halogen, such as LiBr, LiF, LiCl, $LiPF_6$, and $LiBF_4$; compounds that contain lithium and nitrogen, such as LiPON, $LiN(SO_2CF_3)_2$, $LiN(SO_2C_2F_5)_2$, $Li_3N$, and $LiN(SO_2C_3F_7)_2$; crystals having the perovskite structure and lithium ion conductivity, such as $La_{0.55}Li_{0.35}TiO_3$; crystals having the garnet structure, such as $Li_7$—$La_3Zr_2O_{13}$; glass, such as $50Li_4SiO_4 \cdot 50Li_3BO_3$; lithium-phosphorus sulfide crystals, such as $Li_{10}GeP_2S_{12}$ and $Li_{3.25}Ge_{0.75}P_{0.75}S_4$; lithium-phosphorus sulfide glass, such as $30Li_2S \cdot 26B_2S_3 \cdot 44LiI$, $63Li_2S \cdot 36SiS_2 \cdot 1Li_3PO_4$, $57Li_2S \cdot 38SiS_2 \cdot 5Li_4SiO_4$, $70Li_2S \cdot 50GeS_2$, and $50Li_2S \cdot 50GeS_2$; glass ceramics, such as $Li_7P_3S_H$ and $Li_{3.25}P_{0.95}S_4$; and the like.

Regarding the organic solvent that is used to prepare a liquid nonaqueous electrolyte for use in the present invention, known organic solvents usually used in liquid nonaqueous electrolytes can be used alone or in a combination of two or more. Specific examples thereof include a saturated cyclic carbonate compound, a saturated cyclic ester compound, a sulfoxide compound, a sulfone compound, an amide compound, a saturated chain carbonate compound, a chain ether compound, a cyclic ether compound, a saturated chain ester compound, and the like.

Out of the aforementioned organic solvents, a saturated cyclic carbonate compound, a saturated cyclic ester compound, a sulfoxide compound, a sulfone compound, and an amide compound. have a high relative permittivity and hence serve to increase the permittivity of the nonaqueous electrolyte, and a saturated cyclic carbonate compound is particularly preferable. Examples of the saturated cyclic carbonate compound include ethylene carbonate, 1,2-propylene carbonate, 1,3-propylene carbonate, 1,2-butylene carbonate, 1,3-butylene carbonate, 1,1-dimethylethylene carbonate, and the like. Examples of the saturated cyclic ester compound include γ-butyrolactone, γ-valerolactone, γ-caprolactone, δ-hexanolactone, δ-octanolactone, and the like. Examples of the sulfoxide compound include dimethyl sulfoxide, diethyl sulfoxide, dipropyl sulfoxide, diphenyl sulfoxide, thiophene, and the like. Examples of the sulfone compound include dimethyl sulfone, diethyl sulfone, dipropyl sulfone, diphenyl sulfone, sulfolane (also referred to as tetramethylene sulfone), 3-methylsulfolane, 3,4-dimethylsulfolane, 3,4-diphenymethylsulfolane, sulfolene, 3-methylsulfolene, 3-ethylsulfolene, 3-bromomethylsulfolene, and the like, and sulfolane and tetramethylsulfolane are preferable. Examples of the amide compound include N-methylpyrrolidone, dimethylformamide, dimethylacetamide, and the like.

Out of the aforementioned organic solvents, a saturated chain carbonate compound, a chain ether compound, a cyclic ether compound, and a saturated chain ester compound are capable of reducing the viscosity of the nonaqueous electrolyte, improving the mobility of electrolyte ions, and so on, and can therefore achieve excellent battery characteristics such as power density. Also, these compounds have a low viscosity and can therefore improve the performance of the nonaqueous electrolyte at low temperatures. A saturated chain carbonate compound is particularly preferable. Examples of the saturated chain carbonate compound include dimethyl carbonate, ethyl methyl carbonate, diethyl carbonate, ethyl butyl carbonate, methyl-t-butyl carbonate, diisopropyl carbonate, t-butyl propyl carbonate, and the like. Examples of the chain ether compound or the cyclic ether compound include dimethoxyethane, ethoxymethoxyethane, diethoxyethane, tetrahydrofuran, dioxolane, dioxane, 1,2-bis(methoxycarbonyloxy)ethane, 1,2-bis(ethoxycarbonyloxy)ethane, 1,2-bis(ethoxycarbonyloxy)propane, ethylene glycol bis(trifluoroethyl)ether, propylene glycol bis(trifluoroethyl)ether, ethylene glycol bis(trifluoromethyl)ether, diethylene glycol bis(trifluoroethyl)ether, and the like. Among these, dioxolane is preferable.

Monoester and diester compounds having a total of 2 to 8 carbon atoms in the molecule are preferable as the saturated chain ester compound. Specific examples of these compounds include methyl formate, ethyl formate, methyl acetate, ethyl acetate, propyl acetate, isobutyl acetate, butyl acetate, methyl propionate, ethyl propionate, methyl butyrate, methyl isobutyrate, methyl trimethyl acetate, ethyl trimethyl acetate, methyl malonate, ethyl malonate, methyl succinate, ethyl succinate, 3-methoxymethyl propionate, 3-methoxyethyl propionate, diacetyl ethylene glycol, diacetyl propylene glycol, and the like. Methyl formate, ethyl formate, methyl acetate, ethyl acetate, propyl acetate, isobutyl acetate, butyl acetate, methyl propionate, and ethyl propionate are preferable.

In addition to the above-described organic solvents, for example, acetonitrile, propionitrile, nitromethane, and their derivatives, as well as various ionic liquids may also be used as the organic solvent that is used to prepare the nonaqueous electrolyte.

Examples of the polymer for use in the polymer gel electrolyte include polyethylene oxide, polypropylene oxide, polyvinyl chloride, polyacrylonitrile, polymethyl methacrylate, polyethylene, polyvinylidene fluoride, polyhexafluoropropylene, and the like. Examples of the polymer for use in the pure polymer electrolyte include polyethylene oxide, polypropylene oxide, polystyrene sulfonate, and the like. The ratio of the polymer in the gel electrolyte and the method for forming a composite are not particularly limited, and a ratio and a composite-forming method that are known in the art can be employed.

In order to improve battery life, safety, and the like, the nonaqueous electrolyte may also contain other known additives such as an electrode film forming agent, an antioxidant, a flame retardant, and an overcharge inhibitor, for example. In the case where another additive is used, the amount of the other additive is usually 0.01 parts by mass to 10 parts by mass, and preferably 0.1 parts by mass to 5 parts by mass, with respect to the entire nonaqueous electrolyte.

A polymeric microporous film usually used in a nonaqueous electrolyte secondary battery can be used as the separator without limitation. Examples of the film include films that are made of polymeric compounds composed mainly of polyethers, such as polyethylene, polypropylene, polyvinylidene fluoride, polyvinylidene chloride, polyacrylonitrile, polyacrylamide, polytetrafluoroethylene, polysulfone, polyether sulfone, polycarbonate, polyamide, polyimide, polyethylene oxide, and polypropylene oxide, celluloses, such as carboxymethyl cellulose and hydroxypropyl cellulose, and poly(meth)acrylic acid and various esters thereof;

derivatives of these polymeric compounds; as well as copolymers and mixtures of these polymeric compounds and derivatives. These films may be coated with a ceramic material such as alumina or silica, magnesium oxide, aramid resin, or polyvinylidene fluoride.

These films may be used alone or as a double-layer film in which one of these films is laid on top of another. Furthermore, various additives may be used in these films, and the type and the content of the additives are not particularly limited. Among these films, a film made of polyethylene, polypropylene, polyvinylidene fluoride, or polysulfone is favorably used in a secondary battery that is produced using the method for producing a secondary battery. Note that, in the case where the nonaqueous solvent electrolyte is a pure polymer electrolyte or an inorganic solid electrolyte, the battery does not need to include a separator.

The shape of a secondary battery that is produced using the method for producing a secondary battery having the above-described configuration is not particularly limited, and various shapes, such as the shapes of coin-type, cylindrical, rectangular, and laminate-type batteries, can be used. FIG. 1 shows an example of a coin-type nonaqueous electrolyte secondary battery in which the electrode active material of the present invention is used, and FIGS. 2 and 3 show an example of a cylindrical nonaqueous electrolyte secondary battery in which the electrode active material of the present invention is used.

In a coin-type nonaqueous electrolyte secondary battery 10 shown in FIG. 1, 1 denotes a positive electrode that can release lithium ions, 1a denotes a positive electrode current collector, 2 denotes a negative electrode that can occlude and release lithium ions released from the positive electrode, 2a denotes a negative electrode current collector, 3 denotes a nonaqueous electrolyte, 4 denotes a positive electrode case made of stainless steel, 5 denotes a negative electrode case made of stainless steel, 6 denotes a gasket made of polypropylene, and 7 denotes a separator made of polyethylene.

Figure 2:
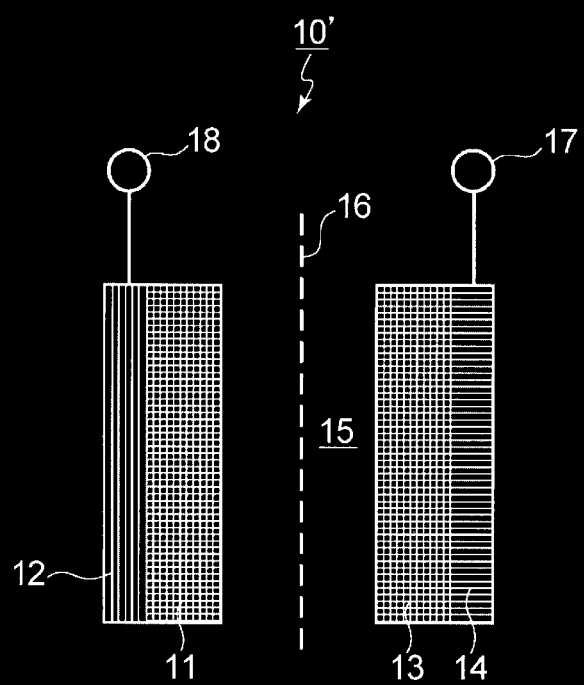
FIG. 2 is a schematic diagram showing a basic configuration of a nonaqueous electrolyte secondary battery (cylindrical type) structure in which an electrode active material of the present invention is used.

In a cylindrical nonaqueous electrolyte secondary battery 10' shown in FIGS. 2 and 3, 11 denotes a negative electrode, 12 denotes a negative electrode current collector, 13 denotes a positive electrode, 14 denotes a positive electrode current collector, 15 denotes a nonaqueous electrolyte, 16 denotes a separator, 17 denotes a positive electrode terminal, 18 denotes a negative electrode terminal, 19 denotes a negative electrode plate, 20 denotes a negative electrode lead, 21 denotes a positive electrode plate, 22 denotes a positive electrode lead, 23 denotes a case, 24 denotes an insulating plate, 25 denotes a gasket, 26 denotes a safety valve, and 27 denotes a PTC device.

A laminate film or a metal container can be used as an exterior member. The thickness of the exterior member is usually 0.5 mm or less, and preferably 0.3 mm or less. The exterior member may have a flat shape (thin shape), a rectangular shape, a cylindrical shape, a coin shape, a button shape, or the like.

A multilayer film that has a metal layer between resin films can also be used as the laminate film. It is preferable to use an aluminum foil or an aluminum alloy foil as the metal layer to reduce the weight. A polymeric material such as polypropylene, polyethylene, nylon, or polyethylene terephthalate, for example, can be used for the resin films. The laminate film can be formed into the shape of the exterior member by performing sealing through fusion bonding.

The metal container can be made of, for example, stainless steel, aluminum, an aluminum alloy, or the like. An alloy containing an element such as magnesium, zinc, or silicon is preferable as the aluminum alloy. It is possible to dramatically improve the long-term reliability and the heat dissipation in a high-temperature environment by using aluminum or an aluminum alloy in which the amount of contained transition metal, such as iron, copper, nickel, or chromium, is 1% or less.

EXAMPLES

Hereinafter, the present invention will be described in greater detail using examples and comparative examples. However, the present invention is not limited by the examples and the like below.

Production Example 1

Synthesis of Sulfur-Modified Polyacrylonitrile

First, 10 parts by mass of polyacrylonitrile powder (manufactured by Sigma-Aldrich) classified through a sieve with an opening diameter of 30 μm and 30 parts by mass of sulfur powder (manufactured by Sigma-Aldrich, average particle diameter: 200 μm) were mixed using a mortar. Then, in conformity with the example disclosed in JP 2013-054957A, the mixture was placed in a cylindrical glass tube that was closed at the bottom, and a lower portion of the glass tube was inserted into a crucible-type electric furnace, followed by heating at 400° C. for one hour while removing generated hydrogen sulfide in a nitrogen gas stream. After cooling, the resulting product was placed in a glass tube oven and heated at 250° C. for three hours under vacuum suction, to thereby remove elemental sulfur. The obtained sulfur-modified product had a sulfur content of 38.4 mass %. Note that the sulfur content was calculated from the results of an analysis that was conducted using a CHN analyzer capable of analyzing sulfur and oxygen.

Comparative Example 1

The sulfur-modified product obtained in Production Example 1 was ground using a ball mill and classified through a sieve to obtain a sulfur-modified polyacrylonitrile PANS 0 with an average particle diameter of 10 μm. PANS 0 was an organosulfur electrode active material that was not treated with a basic compound.

Example 1

First, 50 g of a 0.5 mass % aqueous ammonia solution and 5 g of PANS 0 were placed in a glass beaker and stirred with a stirrer for 10 minutes. Then, the mixture was filtered, further washed with 200 g of distilled water, and then dried in a vacuum dryer at 120° C., to obtain PANS 1, which was an organosulfur electrode active material obtained by treating sulfur-modified polyacrylonitrile with a basic compound.

Example 2

A similar operation to that of Example 1 was performed except that the 0.5 mass % aqueous ammonia solution of Example 1 was changed to a 0.5 mass % aqueous diisopropylamine solution. Thus, PANS 2, which was an organosulfur electrode active material obtained by treating sulfur-modified polyacrylonitrile with a basic compound, was obtained.

Example 3

A similar operation to that of Example 1 was performed except that the 0.5 mass % aqueous ammonia solution of Example 1 was changed to a 1 mass % aqueous triethylamine solution. Thus, PANS 3, which was an organosulfur electrode active material obtained by treating sulfur-modified polyacrylonitrile with a basic compound, was obtained.

Example 4

First, 50 g of a 0.1 mass % aqueous solution of sodium hydroxide and 5 g of PANS 0 were placed in a glass beaker and stirred with a stirrer for 10 minutes. Then, the mixture was filtered, further washed with 500 g of distilled water, and then dried in a vacuum dryer at 120° C., to obtain PANS 4, which was an organosulfur electrode active material obtained by treating sulfur-modified polyacrylonitrile with a basic compound.

Example 5

A similar operation to that of Example 4 was performed except that the 0.1 mass % aqueous solution of sodium hydroxide of Example 4 was changed to a 0.1 mass % aqueous solution of lithium hydroxide. Thus, PANS 5, which was an organosulfur electrode active material obtained by treating sulfur-modified polyacrylonitrile with a basic compound, was obtained.

Example 6

The sulfur-modified product obtained in Production Example 1 was dispersed in a 0.5 mass % aqueous ammonia solution, ground using a ball mill, filtered, and dried. The dried sulfur-modified product was classified through a sieve to obtain a sulfur-modified polyacrylonitrile PANS 6 with an average particle diameter of 10 µm. PANS 6 was an organosulfur electrode active material obtained by treating sulfur-modified polyacrylonitrile with a basic compound.

Comparative Example 2

A similar operation to that of Example 1 was performed except that the 0.5 mass % aqueous ammonia solution of Example 1 was changed to distilled water. Thus, an organosulfur electrode active material PANS 7, which was sulfur-modified polyacrylonitrile that was not treated with a basic compound, was obtained.

Comparative Example 3

A similar operation to that of Example 6 was performed except that the 0.5 mass % aqueous ammonia solution of Example 6 was changed to distilled water. Thus, an organosulfur electrode active material PANS 8, which was sulfur-modified polyacrylonitrile that was not treated with a basic compound, was obtained.

Production of PANS Electrode

Example 7

First, 92.0 parts by mass of PANS 1, which served as an electrode active material, 3.5 parts by mass of acetylene black (manufactured by Denki Kagaku Kogyo) and 1.5 parts by mass of a carbon nanotube (manufactured by Showa Denko K.K., trade name: VGCF), which served as conductive assistants, as well as 1.5 parts by mass of styrene-butadiene rubber (aqueous dispersion, manufactured by Zeon Corporation) and 1.5 parts by mass of sodium carboxymethyl cellulose (manufactured by Daicel FineChem Ltd.), which served as binders, were dispersed in 120 parts by mass of water, which served as a solvent, using a rotation-revolution mixer, to prepare a slurry. Then, this slurry composition was applied to a current collector formed of an aluminum foil (thickness: 20 µm) using a doctor blade method, and dried at 90° C. for three hours. After that, this electrode was cut into a predetermined size, and vacuum-dried at 120° C. for two hours, and thus, an electrode of Example 7 was produced.

Examples 8 to 14 and Comparative Examples 4 to 10

Electrodes of Examples 8 to 14 and Comparative Examples 4 to 10 were produced by changing the electrode active material and the current collector to those listed in Table 1. Note that the stainless-steel foils had a thickness of 10 µm, and the carbon-coated aluminum foils used were constituted by an aluminum foil with a thickness of 20 µm and a carbon layer with a thickness of 1 µm.

TABLE 1

| | Organosulfur electrode active material | Current collecting material |
|---|---|---|
| Ex. 7 | PANS 1 | Aluminum foil |
| Ex. 8 | PANS 2 | Aluminum foil |
| Ex. 9 | PANS 3 | Aluminum foil |
| Ex. 10 | PANS 4 | Aluminum foil |
| Ex. 11 | PANS 5 | Aluminum foil |
| Ex. 12 | PANS 6 | Aluminum foil |
| Ex. 13 | PANS 1 | Stainless-steel foil |
| Ex. 14 | PANS 1 | Carbon-coated aluminum foil |
| Com. Ex. 4 | PANS 0 | Aluminum foil |
| Com. Ex. 5 | PANS 7 | Aluminum foil |
| Com. Ex. 6 | PANS 8 | Aluminum foil |
| Com. Ex. 7 | PANS 0 | Stainless-steel foil |
| Com. Ex. 8 | PANS 7 | Stainless-steel foil |
| Com. Ex. 9 | PANS 0 | Carbon-coated aluminum foil |
| Com. Ex. 10 | PANS 8 | Carbon-coated aluminum foil |

Production of Positive Electrode

First, 90.0 parts by mass of $Li(Ni_{1/3}Co_{1/3}Mn_{1/3})O_2$ (manufactured by Nihon Kagaku Sangyo Co., Ltd., trade name: NCM111), which served as a positive electrode active material, 5.0 parts by mass of acetylene black (manufactured by Denki Kagaku Kogyo), which served as a conductive assistant, and 5.0 parts by mass of polyvinylidene fluoride (manufactured by Kureha Corporation), which served as a binder, were dispersed in 90.0 parts by mass of N-methylpyrrolidone, which served as a solvent, using a rotation-revolution mixer, to prepare a slurry. Then, this slurry composition was applied to a current collector formed of an aluminum foil (thickness: 20 µm) using a doctor blade method, and dried at 90° C. for one hour. After that, this electrode was cut into a predetermined size, and vacuum-dried at 120° C. for two hours, and thus, a positive electrode was produced.

Preparation of Nonaqueous Electrolyte

An electrolyte solution was prepared by dissolving $LiPF_6$ in a mixed solvent composed of ethylene carbonate in an amount of 50 vol % and diethyl carbonate in an amount 50 vol % so that the concentration of $LiPF_6$ was 1.0 mol/L.

Battery Assembling 1

A disc-shaped electrode in which sulfur-modified polyacrylonitrile was used as an electrode active material was provided, and a lithium metal that was cut into a disc shape and had a thickness of 500 µm was used as the counter electrode. The electrodes were held in a case with a glass filter, which served as a separator, sandwiched therebetween. After that, a nonaqueous electrolyte that was prepared in advance was injected into the case, and the case was hermetically sealed. Thus, a nonaqueous electrolyte secondary battery (coin-type with φ 20 mm and a thickness of 3.2 mm) was produced. Note that, in this battery, the disc-shaped electrode in which sulfur-modified polyacrylonitrile was used as the electrode active material served as the positive electrode, and the lithium metal served as the negative electrode.

Charge and Discharged Test 1

The nonaqueous electrolyte secondary battery that was produced in Battery Assembling 1 was placed in a constant temperature bath at 25° C., and a charge and discharged test was performed a total of nine times as follows: a charge and discharged test with a charge cut-off voltage of 3 V and a discharge cut-off voltage of 1 V was performed three times at a charge rate of 0.1 C and a discharge rate 0.1 C, subsequently performed three times at a charge rate of 0.2 C and a discharge rate of 0.2 C, and then performed three times at a charge rate of 0.5 C and a discharge rate of 0.5 C, and the discharge capacity (unit: mAh/g) was measured. Table 2 shows the discharge capacity that was measured in the ninth test. Note that the discharge capacity means the discharge amount per mass of the sulfur-modified polyacrylonitrile, which was used as the positive electrode active material. The discharge capacity decreases as charging and discharging are repeated, and the higher the charge rate and the discharge rate, the greater the decrease in discharge capacity. Accordingly, higher discharge capacities measured in the ninth test and shown in Table 2 indicate that the discharge capacity was less likely to decrease even when charging and discharging were repeated, or indicate superior cycle characteristics.

TABLE 2

|  | Discharge capacity (mAh/g) |
| --- | --- |
| Ex. 7 | 423 |
| Ex. 8 | 420 |
| Ex. 9 | 416 |
| Ex. 10 | 415 |
| Ex. 11 | 424 |
| Ex. 12 | 424 |
| Ex. 13 | 423 |
| Ex. 14 | 425 |
| Com. Ex. 4 | 105 |
| Com. Ex. 5 | 113 |
| Com. Ex. 6 | 108 |
| Com. Ex. 7 | 401 |
| Com. Ex. 8 | 405 |
| Com. Ex. 9 | 399 |
| Com. Ex. 10 | 403 |

Battery Assembling 2

A disc-shaped positive electrode in which $Li(Ni_{1/3}Co_{1/3}Mn_{1/3})O_2$ was used as the electrode active material was provided, and a disc-shaped electrode in which an organo-sulfur compound was used as the electrode active material was used as a negative electrode serving as the counter electrode. The electrodes were held in a case with a separator (manufactured by Celgard, LLC., trade name: Celgard 2325) sandwiched therebetween. After that, a nonaqueous electrolytic solution that was prepared in advance was injected into the case, and the case was hermetically sealed. Thus, a nonaqueous electrolyte secondary battery (coin-type with φ 20 mm and a thickness of 3.2 mm) was produced.

Charge and Discharge Evaluation 2

The nonaqueous electrolyte secondary battery produced in Battery Assembling 2 was placed in a constant temperature bath at 25° C., and a charge and discharged test was performed a total of 105 times as follows: a charge and discharged test with a charge cut-off voltage of 3.2 V and a discharge cut-off voltage of 0.8 V was performed five times at a charge rate of 0.1 C and a discharge rate of 0.1 C and subsequently performed 100 times at a charge rate of 0.5 C and a discharge rate of 0.5 C, and the discharge capacity (unit: mAh/g) was measured. Note that the discharge capacity means the discharge amount per mass of $Li(Ni_{1/3}Co_{1/3}Mn_{1/3})O_2$, which was used as the positive electrode active material. Table 3 shows the discharge capacity that was measured in the 105-th test.

TABLE 3

|  | Discharge capacity (mAh/g) |
| --- | --- |
| Ex. 7 | 120 |
| Ex. 8 | 118 |
| Ex. 9 | 118 |
| Ex. 10 | 119 |
| Ex. 11 | 120 |
| Ex. 12 | 120 |
| Ex. 13 | 121 |
| Ex. 14 | 121 |
| Com. Ex. 4 | 36 |
| Com. Ex. 5 | 40 |
| Com. Ex. 6 | 39 |
| Com. Ex. 7 | 108 |
| Com. Ex. 8 | 107 |
| Com. Ex. 9 | 109 |
| Com. Ex. 10 | 108 |

With the electrodes using the organosulfur electrode active materials that were not subjected to base treatment, when the current collector was a stainless-steel foil or a carbon-coated aluminum foil, excellent cycle characteristics were achieved, but when the current collector was an aluminum foil, the cycle characteristics deteriorated. With the electrodes using the organosulfur electrode active materials that were subjected to base treatment, electrodes with excellent cycle characteristics were obtained even when an aluminum foil was used as the current collector.

INDUSTRIAL APPLICABILITY

According to the method for producing an organosulfur electrode active material of the present invention, a non-aqueous electrolyte secondary battery that exhibits less deterioration of the cycle characteristics can be provided even when an electrode is employed in which a sulfur-based electrode active material is used as an electrode active material and an aluminum foil is used as a current collector.

LIST OF REFERENCE NUMERALS

1 Positive electrode
1a Positive electrode current collector
2 Negative electrode
2a Negative electrode current collector
3 Electrolyte
4 Positive electrode case
5 Negative electrode case
6 Gasket
7 Separator
10 Coin-type nonaqueous electrolyte secondary battery
10' Cylindrical nonaqueous electrolyte secondary battery
11 Negative electrode 12 Negative electrode current collector
13 Positive electrode
14 positive electrode current collector
15 Electrolytic solution
16 Separator
17 Positive electrode terminal
18 Negative electrode terminal
19 Negative electrode plate
20 Negative electrode lead
21 Positive electrode
22 Positive electrode lead
23 Case
24 Insulating plate
25 Gasket
26 Safety valve
27 PTC device

The invention claimed is:

1. A method for producing an organosulfur electrode active material, the method comprising:
a step of obtaining an organosulfur compound by heat-treating an organic compound and sulfur; and
a step of treating the organosulfur compound with a basic compound.

2. The method for producing an organosulfur electrode active material according to claim 1, wherein the organosulfur compound is treated with the basic compound after the organosulfur compound is ground.

3. The method for producing an organosulfur electrode active material according to claim 1, wherein the organosulfur compound is ground in a medium that contains the basic compound.

4. The method for producing an organosulfur electrode active material according to claim 1, wherein the organosulfur compound is sulfur-modified polyacrylonitrile.

5. The method for producing an organosulfur electrode active material according to claim 1, wherein the basic compound is ammonia.

6. A method for producing a secondary battery electrode, the method comprising the method for producing an organosulfur electrode active material according to claim 1.

7. The method for producing a secondary battery electrode according to claim 6, comprising:
a step of applying the organosulfur electrode active material to a current collector formed of an aluminum foil.

8. An electrode comprising an organosulfur electrode active material that is produced using the method for producing an organosulfur electrode active material according to claim 1.

9. The electrode according to claim 8, comprising an aluminum foil as a current collector.

10. The method for producing an organosulfur electrode active material according to claim 2, wherein the organosulfur compound is sulfur-modified polyacrylonitrile.

11. The method for producing an organosulfur electrode active material according to claim 3, wherein the organosulfur compound is sulfur-modified polyacrylonitrile.

12. The method for producing an organosulfur electrode active material according to claim 2, wherein the basic compound is ammonia.

13. The method for producing an organosulfur electrode active material according to claim 3, wherein the basic compound is ammonia.

14. The method for producing an organosulfur electrode active material according to claim 4, wherein the basic compound is ammonia.

15. A method for producing a secondary battery electrode, the method comprising the method for producing an organosulfur electrode active material according to claim 2.

16. A method for producing a secondary battery electrode, the method comprising the method for producing an organosulfur electrode active material according to claim 3.

17. A method for producing a secondary battery electrode, the method comprising the method for producing an organosulfur electrode active material according to claim 4.

18. A method for producing a secondary battery electrode, the method comprising the method for producing an organosulfur electrode active material according to claim 5.

19. An electrode comprising an organosulfur electrode active material that is produced using the method for producing an organosulfur electrode active material according to claim 2.

20. An electrode comprising an organosulfur electrode active material that is produced using the method for producing an organosulfur electrode active material according to claim 3.

* * * * *